US012649329B2

(12) United States Patent
Glennon Benjamin et al.

(10) Patent No.: US 12,649,329 B2
(45) Date of Patent: Jun. 9, 2026

(54) METHOD AND APPARATUS FOR HIGH CONTRAST PRINTING

(71) Applicant: Markem-Imaje Corporation, Keene, NH (US)

(72) Inventors: Ann Elizabeth Glennon Benjamin, Epping, NH (US); Stewart Wayne Wilson, Clearwater, FL (US); Keith Russell Sanctuary, Alstead, NH (US); Cameron Dee Dryden, West Roxbury, MA (US)

(73) Assignee: Markem-Imaje Corporation, Keene, NH (US)

( * ) Notice: Subject to any disclaimer, the term of this patent is extended or adjusted under 35 U.S.C. 154(b) by 297 days.

(21) Appl. No.: 18/328,676

(22) Filed: Jun. 2, 2023

(65) Prior Publication Data
US 2024/0399779 A1 Dec. 5, 2024

(51) Int. Cl.
*B41M 7/00* (2006.01)
*G02B 27/09* (2006.01)

(52) U.S. Cl.
CPC ........... *B41M 7/0081* (2013.01); *G02B 27/09* (2013.01)

(58) Field of Classification Search
CPC ....... B41M 7/0081; G02B 27/09; B41J 3/407; B41J 3/4073; B41J 11/0015; G06K 1/121
See application file for complete search history.

(56) References Cited

U.S. PATENT DOCUMENTS

| | | | | |
|---|---|---|---|---|
| 5,774,146 | A | * | 6/1998 | Mizutani .................... B41J 2/21 |
| | | | | 347/15 |
| 7,104,709 | B1 | | 9/2006 | Maher et al. |
| 10,328,530 | B2 | | 6/2019 | Krajca et al. |
| 2004/0228985 | A1 | | 11/2004 | Calland |
| 2007/0274559 | A1 | | 11/2007 | Depta et al. |

(Continued)

FOREIGN PATENT DOCUMENTS

| | | | | |
|---|---|---|---|---|
| CN | 107138859 A | * | 9/2017 | .............. B41M 5/24 |
| CN | 214730896 U | | 11/2021 | |

(Continued)

OTHER PUBLICATIONS

English Translation JP2020175512 (Year: 2020).*

(Continued)

*Primary Examiner* — Ricardo I Magallanes
*Assistant Examiner* — Tracey M Mcmillion
(74) *Attorney, Agent, or Firm* — Fish & Richardson P.C.

(57) ABSTRACT

Methods, systems, and apparatus, including medium-encoded computer program products, for a system including: at least one ink-based printer configured and arranged to provide ink to form a symbol on a surface of a material; at least one laser bleaching subsystem including a laser operable to produce a laser beam, and an optical assembly operable to convey the laser beam onto the surface of the material to generate an oxidized region on the surface of the material; and electronics communicatively coupled with the at least one ink-based printer and the at least one laser bleaching subsystem, the electronics being configured to coordinate control operations of the at least one ink-based printer and the at least one laser bleaching subsystem based on a nature of the surface of the material.

20 Claims, 10 Drawing Sheets

(56)　　　　　References Cited

U.S. PATENT DOCUMENTS

| | | |
|---|---|---|
| 2008/0250954 A1 | 10/2008 | Depta et al. |
| 2009/0120309 A1 | 5/2009 | Szyszko |
| 2014/0063158 A1 | 3/2014 | Liu |
| 2015/0246552 A1 | 9/2015 | Liu |
| 2022/0009262 A1 | 1/2022 | Seshaiya Doraiswamy Chandrasekar |
| 2022/0048135 A1* | 2/2022 | Brookhyser ....... B23K 26/0648 |
| 2024/0399766 A1 | 12/2024 | Glennon Benjamin et al. |

FOREIGN PATENT DOCUMENTS

| | | | |
|---|---|---|---|
| EP | 3481637 | | 8/2022 |
| EP | 4238689 | | 9/2023 |
| JP | 2010100011 | A | 5/2010 |
| JP | 2020175512 | A　* | 10/2020 |
| WO | WO 2017203219 | A1 | 11/2017 |

OTHER PUBLICATIONS

English Translation CN107138859 (Year: 2017).*
English Translation CN214730896 (Year: 2021).*
Extended European Search Report in European Appln No. 24179194. 6, dated Oct. 31, 2024, 11 pages.

China OV Laser-Jully Tao [online], "Galvo co2 laser marking machine for engraving cardboard," Nov. 18, 2020, retrieved on Dec. 20, 2023, <https://www.youtube.com/watch?v=0-HkkBmaILs>, 1 page [Video Submission].
Macsa ID, S.A. [online], "Fiber laser marking a Datamatrix Code on Aluminum for the automotive market, by Macsa ID," Feb. 13, 2014, retrieved on Dec. 20, 2023,<https://www.youtube.com/watch?app=desktop&v=3YMACq52n6A>, 1 page [Video Submission].
Macsa Id, S.A. [online], "Marking QR codes directly onto cardboard with laser—Macsa id Success Story," Mar. 3, 2020, retrieved on Dec. 20, 2023, <https://www.youtube.com/watch?v=xEI_cDB12TA>, 1 page [Video Submission].
Solaris Laser, "Trial Report," IKEA, Sweden, Jul. 23, 2013, 3 pages.
Solaris Laser, "Trial Report," Matthews, FR, Jul. 23, 2013, 2 pages.
CajoTechnologies.com [online], "Solutions for Packaging Industry," available on or before Jan. 17, 2022, retrieved on Jun. 2, 2023, retrieved from URL<https://cajotechnologies.com/solutions/solutions-for-packaging-industry/>, 7 pages.
Thunder Laser USA, "How Burning and Scorching WhenLaser Cutting," retrieved on Oct. 4, 2021, retrieved from URL<https://www.thunderlaserusa.com/preventing-burning-when-laser-cutting/>, 5 pages.

* cited by examiner

Ink

Laser
Pattern

Final
Product

METHOD AND APPARATUS FOR HIGH CONTRAST PRINTING

BACKGROUND

Retailers and shipping companies have standards for the readability of barcodes on packages, e.g., "A-" or "B-grade" barcodes. The standards include contrast between the barcode and the background. Common approaches to achieve high-quality barcodes include applying labels with black ink printed on a white background, directly printing a white background onto the package and then printing black ink on top of the white background, and lasing to both bleach and burn the package.

SUMMARY

This specification describes technologies relating to high contrast printing on packages. In general, one or more aspects of the subject matter described in this specification can be embodied in one or more systems that include: at least one ink-based printer configured and arranged to provide ink to form a symbol on a surface of a material; at least one laser bleaching subsystem including a laser operable to produce a laser beam, and an optical assembly operable to convey the laser beam onto the surface of the material to generate an oxidized region on the surface of the material; and electronics communicatively coupled with the at least one ink-based printer and the at least one laser bleaching subsystem, the electronics being configured to coordinate control operations of the at least one ink-based printer and the at least one laser bleaching subsystem based on a nature of the surface of the material.

In another general aspect, innovative aspects of the subject matter described in this specification can be embodied in methods that include actions of: collecting, by a reflectivity sensor, reflectivity data about a package being conveyed in a product line; determining, using the reflectivity data, control parameters of a laser bleaching subsystem and an ink-based printer; lasing, by the laser bleaching subsystem, a portion of a surface of the package, thereby generating an oxidized region on the surface of the package; and printing, by the ink-based printer, a symbol on the surface of the package, wherein the symbol at least partially borders the oxidized region, is at least partially within the oxidized region, or both.

The foregoing and other implementations can each optionally include one or more of the features described herein, alone or in combination. In particular, one implementation includes all the following features in combination.

In some implementations, the optical assembly includes a line generator configured and arranged to shape the laser beam into a line of a predetermined length across the surface of the material to generate the oxidized region on the surface of the material.

In some implementations, the electronics are configured to coordinate the control operations based on the nature of the surface of the material as determined by data from the reflectance sensor.

In some implementations, the reflectance sensor is an imager including multiple photodetectors, which provide the data, and the electronics are configured to determine average reflectivity and speckle from the data.

In some implementations, the electronics are configured to control a placement of the symbol on the surface of the material based on the speckle.

In some implementations, the at least one laser bleaching subsystem includes a first laser bleaching subsystem located before the at least one ink-based printer on a product line, and a second laser bleaching subsystem located after the at least one ink-based printer on the product line, and the electronics are configured to control an order of ink printing and laser bleaching.

In some implementations, the optical assembly includes a beam director arranged to scan a projected spot of the laser beam onto the surface of the material along a controllable path to generate the oxidized region on the surface of the material.

In some implementations, the electronics are configured to control one or more parameters of the projected spot of the laser beam to adjust an optical fluence of the laser beam based on the average reflectivity, the one or more parameters including spot dwell time, a distance between spot dwells, laser power, laser wavelength, or a combination thereof.

In some implementations, the electronics are configured to interlace ink from the at least one ink-based printer and laser bleaching by the at least one laser bleaching subsystem to form the symbol.

In some implementations, the symbol is a barcode, the system including an alignment subsystem configured to interdigitate dark ink segments of the barcode with bleached portions of the surface between the dark ink segments.

In some implementations, the projected spot of the laser beam on the surface of the material includes an optical fluence between 0.5 and 1.1 $J/cm^2$. The controllable path can include at least a 30% overlap of the projected spot of the laser beam on the surface of the material as the optical assembly scans the projected spot of the laser beam on the surface of the material.

In some implementations, a laser wavelength is infrared, and the controllable path includes between 30% and 56% overlap of the projected spot of the infrared laser beam as the optical assembly scans the projected spot of the infrared laser beam on the surface of the material.

In some implementations, a wavelength of the laser is 9.3 microns.

In some implementations, the oxidized region on the surface of the material obtains a 55% maximum reflectance on a barcode reader.

In some implementations, the material is brown corrugate, the symbol on the surface of the material is a B-grade data-encoding symbol, and a contrast between dark ink of the data-encoding symbol and the oxidized region is at least 50%.

In some implementations, the at least one ink-based printer is selected from a group consisting of a continuous inkjet printer, liquid piezoelectric printer, hot melt piezoelectric printer, and a flexographic printer.

In some implementations, the at least one laser bleaching subsystem is located after the at least one ink-based printer on a product line, and the at least one laser bleaching subsystem lases the symbol, thereby darkening the symbol.

In some implementations, the reflectivity data includes speckle, and the control parameters include a placement of the symbol on the surface of the package.

In some implementations, the control parameters include spot dwell time, a distance between spot dwells, laser power, laser wavelength, or a combination thereof.

Moreover, in some implementations, a non-transitory, computer-readable medium encodes instructions configured to cause the data processing apparatus to perform one or more methods, as detailed above and herein. Moreover, the system can include the computer-controlled manufacturing equipment and/or subsystem.

Particular embodiments of the subject matter described in this specification can be implemented to realize one or more of the following advantages. In some implementations, compared to conventional methods, the disclosed methods can reduce complexity and thus chance for error, printer resources used, and/or time taken to print high contrast barcodes. For example, there is no need for labels, which removes the cost of label and the added step of applying a label. As another example, there is no need for white background ink, which removes the cost of white ink, reduces the time by not needing to allow the white ink to dry, and removes the need for special recirculation features to ensure that compounds in the white ink do not separate.

In some implementations, compared to conventional methods, the disclosed methods produce barcodes with higher contrast. For example, compared to systems that only use a laser to both bleach and burn the surface of the package, using the disclosed methods can yield higher contrast barcodes.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
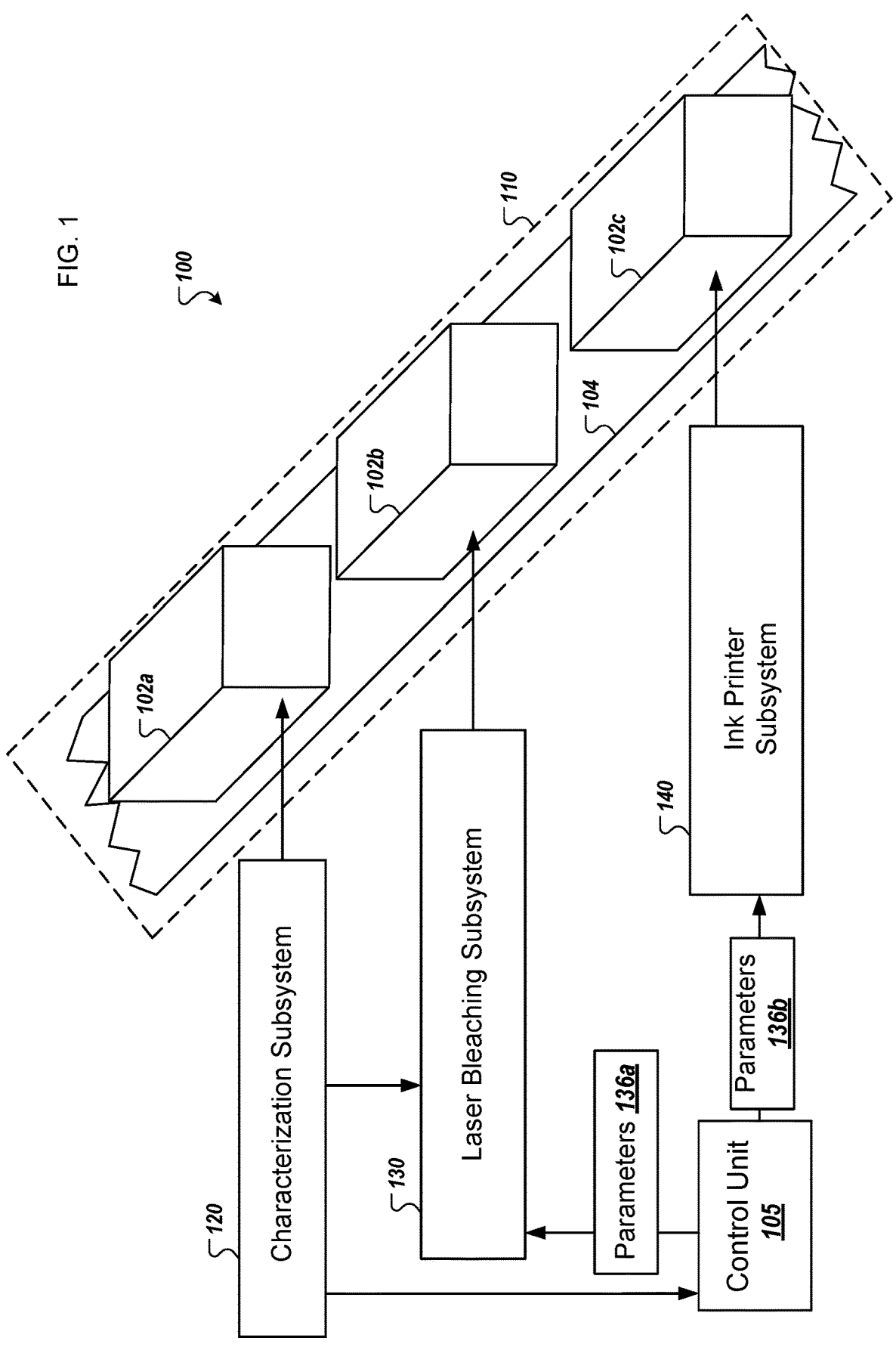
FIG. 1 depicts an example of a system for high contrast printing.

High contrast barcodes on packages allow for more reliable package identification compared to lower-contrast barcodes. A variety of governing specifications and grading specifications classify barcodes. For example, types of barcodes include GS1-128, ITF-14, Code 128, UPC-A, UPC-E, GS1 Datamatrix, GS1 Q2, and PDF 417. Governing specifications include ISO/IEC 15417:2007, ISO/IEC 15438: 2015, and GS1 general specifications. Grading specifications include ISO/IEC 15416:2016 and ISO/IEC 15415: 2011. Barcode grades of "A," "B," and "high C" are required by most shippers.

Parameters that determine the grade of the barcode can include decode (a binary rating of a barcode, e.g., pass or fail), minimum reflectance, symbol contrast, minimum edge contrast, modulation, defects, decodability (a graded factor of overall barcode quality), and the grade of each scan, where the average grade of ten scans determines the total grade. Of these parameters, minimum reflectance, maximum reflectance, minimum edge contrast, symbol contrast, modulation, and defects are related to the contrast achievable on the media of the package, e.g., corrugate cardboard. The symbol contrast is the difference between the maximum and minimum reflectance as measured by percentage.

Achieving symbol contrast requires that the package media surrounding the barcode is sufficiently bright, e.g., a high maximum reflectance, and that the ink is sufficiently dark, e.g., a low minimum reflectance. In the disclosed methods, laser bleaching is used to increase the reflectance of the media surrounding a symbol.

Polymeric materials, such as paper and corrugated cardboard, absorb optical radiation via stimulation of dipole oscillations. Depending on the wavelength of the optical radiation, either bonded electrons or charge distributions of molecule segments from macromolecules create induced or prominent dipoles. Polymeric materials have three distinct wavelength regions that allow for optical absorption without the requirement of color additive, laser active additive and impurities, or any transfer. The first wavelength region is ultraviolet wavelengths less than 360 nm, e.g., 200 to 360 nm. The second wavelength region is the primary band, which has three sub-regions A: 3 to 4 micron, B: 6 to 8 micron, and C: 9 to 11 micron. The third wavelength region is a secondary band, which is 1.2 to 2.5 micron.

Laser bleaching can occur by optical absorption in either the pyrolytic or photolytic regimes. The optical interaction time of the exposure onto the package dictates which regime is dominant. In the pyrolytic regime, thermal processes dominate. The wavelength of the radiation provides enough overlap with the absorption profile of the media of the package, enabling enough energy transfer from light to heat. Bleaching occurs by effectively heating the media enough so that it turns white, e.g., oxidizes, but does not burn the media. An interaction will typically be pyrolytic for wavelengths greater than 1200 nm and optical interaction times greater than 10 ns.

In the photolytic regime, chemical processes dominate. The wavelength of the radiation is low enough to facilitate dissociation of dipole molecular bonds in the media, which causes a localized color change. An interaction will typically be photolytic if the energy of the laser is sufficiently high, e.g., wavelengths less than 360 nm or photon energies greater than 3.4 eV, and for optical interaction times less than 10 ns.

The ideal interaction or dwell time for an optical beam in a given target media is limited by the thermal relaxation time of the medium, to prevent burning or non-whitening of the surface. The following equations govern these relationships:

$$E_o = P_o \times \tau_{dwell}, E_o = \text{optical energy}, P_o = \text{optical power}, \tau_{dwell} \ll \tau_{thermal}$$

$$F = E_o/A, F = \text{fluence}, A = \text{area}$$

The amount of optical energy concentration, e.g., fluence (energy per unit area), required to bleach the material is inversely related to the level of optical absorption. For example, the lower the absorption, the higher the optical fluence must be to bleach the surface. Similarly, the higher the absorption, the lower the optical fluence must be to bleach the surface. Lower fluences allow for faster printing times and lower optical power requirements for the system. Consequently, the absorption determines the energy concentration, which can be varied by adjusting the optical spot size or increasing the delivered optical power for a given dwell time.

FIG. 1 depicts an example of a system 100 for high contrast printing. The system 100 includes a package conveying system 110, an optional characterization subsystem 120, a laser bleaching subsystem 130, an ink printer subsystem 140, and a control unit 105. A package conveying system 110 conveys packages, e.g., packages 102a, 102b, and 102c, on a conveyor belt 104 or another support structure.

As the packages 102 move along the conveyor belt 104, each of the subsystems acts upon each package 102. The characterization subsystem 120 can identify the type of each package 102 and measure qualities of the package that will affect the parameters chosen for lasing and printing. The laser bleaching subsystem 130 oxidizes a portion of the surface of the package 102, and the ink printer subsystem 140 prints a symbol on the surface of the package 102. The control unit 105 communicates with the laser bleaching subsystem 130 and ink printer subsystem 140, e.g., electronics of the control unit 105 are coupled to the laser bleaching subsystem 130 and ink printer subsystem 140. For example, the control unit 105 can send parameters 136a, e.g., optical parameters, to the laser bleaching subsystem 130 and parameters 136b, e.g., printer parameters, to the ink printer subsystem 140.

Although the laser bleaching subsystem 130 is depicted as being placed before the ink printer subsystem 140, the order can be reversed, and in some implementations, a laser bleaching subsystem 130 can be provided both upstream and downstream of the ink printer subsystem 140. Each of the subsystems will be described in more detail with reference to other figures.

Figure 2:
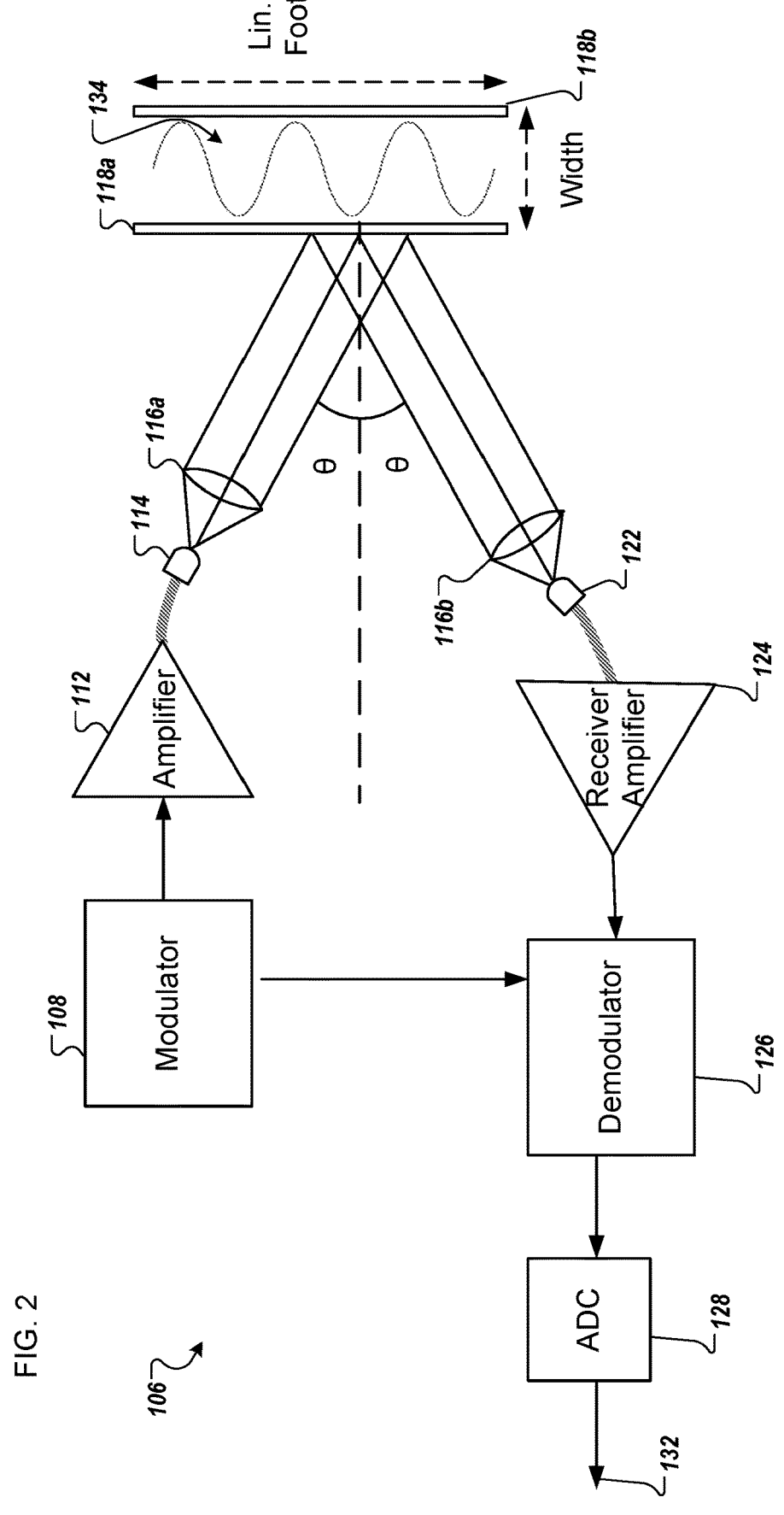
FIG. 2 depicts an example of a package reflectance sensor within the characterization subsystem.

FIG. 2 depicts an example of a package reflectance sensor 106 within the characterization subsystem 120. The package reflectance sensor 106 can take measurements used to determine if the surface of the package is too dark to be sufficiently bleached to obtain the desired grade barcode. If the desired grade can be obtained, the reflectance measurements can be used to determine what laser fluence to use when lasing.

To reduce the effects of ambient light on the reflectance measurement, an emitter signal can be modulated by modulator 108, e.g., using alternating current. An amplifier 112 amplifies the light coming from emitter 114. In some implementations, the emitter is a narrow band 660 nm emitter, e.g., a laser or LED. The emitted light travels through a convex lens 116a, which provides a wide area beam on the outer surface 118a of the package. If the outer surface 118a of the package is flat, the light will travel to a receiver lens 116b at the same angle θ. The emitter 114 and a receiver 122 can be arranged at an angle, e.g., 2θ=45°, such that some light reflects off of the outer surface 118a and into the receiver 122.

The received light reaches the receiver 122. The receiver amplifier 124 amplifies the signal generated by the received light. Then demodulator 126 demodulates the amplified light. The demodulated receive signal is converted to a digital value using an analog-to-digital converter (ADC) 128. The output 132 can represent the overall darkness of the outer surface 118a. In some implementations, the overall darkness is a spatial average measurement. For example, the overall darkness can be measured optically, e.g., using a lens to blur an area of an image and measuring the blurred area with a single photodetector. As another example, the darkness can be measured electronically and numerically, e.g., using another lens to take a high resolution image of the area of the image and averaging the brightness values over pixels in the area. The average can be a weighted average to compensate for the reduction in light intensity near the perimeter of the lens field of view. The characterization subsystem 120 can send the output 132 to the control unit 105, which can send instructions based on the output 132 to the laser bleaching subsystem 130.

The laser bleaching subsystem 130 can deliver a laser beam to the surface of the package in a variety of ways. In some implementations, the pattern formed by the laser beam bleaching the surface includes linear shapes. Accordingly, the laser bleaching subsystem 130 can perform beam scanning or a different type of method to create the linear shapes. For example, the laser bleaching subsystem 130 can employ mechanical beam scanning using a galvometer. An optical lensing system, which can include one or more of an F-theta lens and telecentric lens, can be used with two galvometers, when beam scanning in two dimensions, or with one galvometer, when beam scanning in one dimension. In some implementations, the mechanical beam scanning can utilize a holographic scanner, a (micro-electro-mechanical system) MEMS scanner, or a spinning polygon mirror, e.g., prismatic polygon scanner or a pyramidal polygon scanner.

Other methods of beam scanning are possible. In some implementations, beam scanning can be performed using acousto-optical scanners, which deflect the beam using diffraction. In some implementations, beam scanning can be performed using electro-optic scanners, which deflect the beam using refraction. In some implementations, the laser bleaching subsystem 130 includes a diffractive optical element (DOE), a piezo mirror scanner, a voice coil mirror scanner, or a combination thereof to generate a line beam.

Figure 3B:
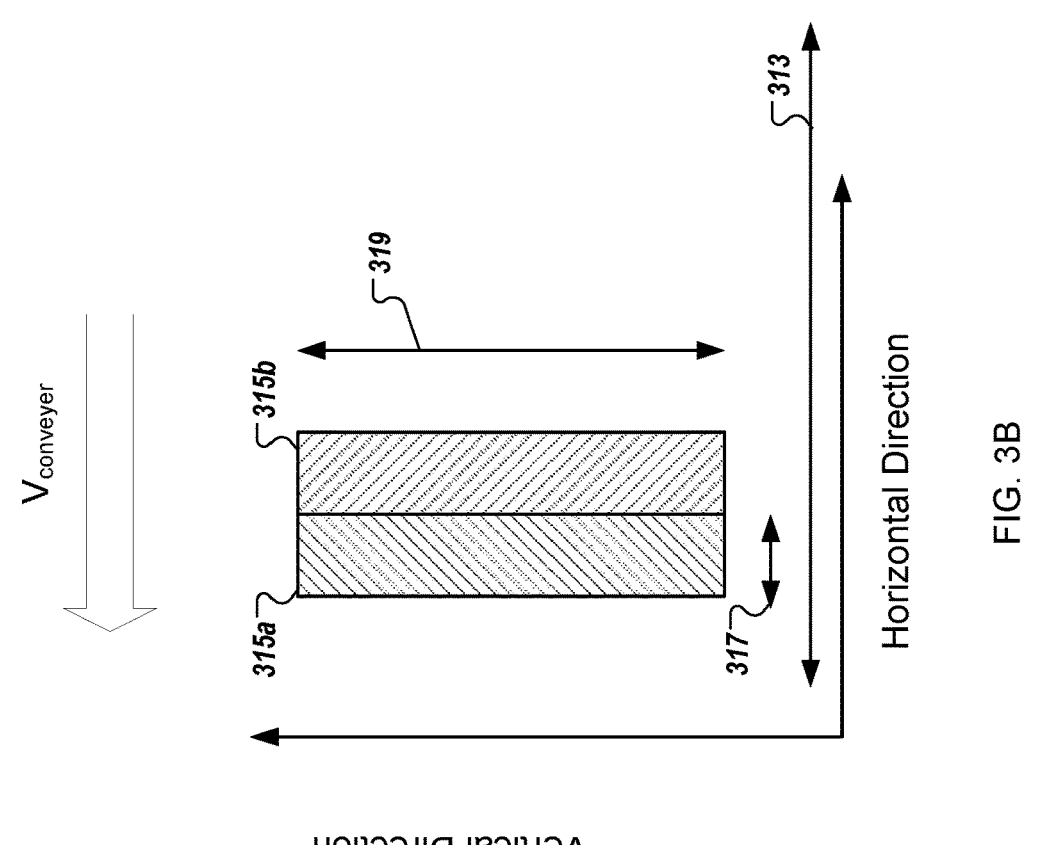
FIGS. 3A and 3B depict the effective beam shape on laser parameters for overlapping profiles of a laser beam.
Figure 3A:
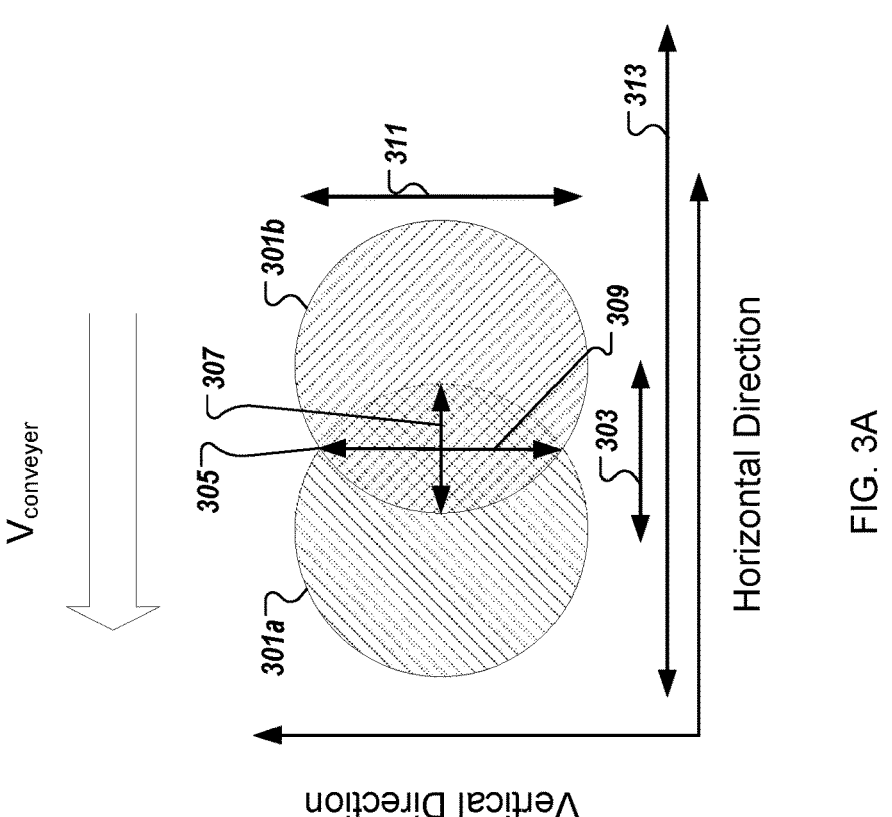

When delivering the laser beam with non-beam scanning methods, other optical components can be used. For a given target fluence, the beam exposure shape and area, e.g., the area of the laser beam when it hits the surface of the package, strongly impacts the required laser power. Generating linear beams, instead of circular beams, can reduce the required laser energy to reach the same target fluence. FIGS. 3A and 3B depict the effect of beam shape on laser parameters for overlapping profiles of a laser beam, e.g., sequential positions of either a pulsed laser or a continuous wave (CW) laser during each dwell time. Depending on the dwell time, laser pulse width, repetition rate, and conveyer speed, the two laser profiles can overlap within a threshold period of time. In some implementations, generating a linear beam, instead of a circular beam, can reduce the power required from the laser to reach a target fluence on the package.

In FIG. 3A, two consecutive laser profiles create circular laser beams 301a and 301b, e.g., beams having a circular shape on the surface of the package. In some implementations, circular laser beams 301a and 301b are generated by a laser beam passing through an optical component with positive optical power that expands the beam size while maintaining a circular profile. In some implementations, the dwell time and beam path can be configured to cause regions of the laser beams 301a and 301b to overlap. In some implementations, the energy density of the laser beams 301a and 301b is highest in the center and lowest near the circumference, e.g., follows a Gaussian distribution. The regions that will overlap will have relatively low energy density since those regions are located toward the edge of the laser beams 301a and 301b. Consequently, by overlapping the laser beams 301a and 301b within a certain time period, the optical fluence per unit time can be increased in the overlapping regions.

Depending on the speed of the conveyor belt $V_{conveyor}$, the laser beams 301a and 301b are separated by a distance 303 when encountering the surface of the package, e.g., in the case of one dimensional beam scanning; in the case of two dimensional beam scanning, the distance 203 can depend on both the speed of the conveyor belt and the redirection of the laser beam in the dimension parallel with the direction of the conveyor belt. Although the laser beams 301 and 301b encounter the package at different times, the two laser beams 301a and 301b can have an overlapping area 305. The size of the overlapping area 305, e.g., width 307 and height 309, is determined by distance 303 and the diameter 311 of the two laser beams 301a and 301b.

Generating a linear beam instead of a circular beam can more efficiently use the power of the laser to reach a target fluence, thereby reducing the required power of the laser compared to using a circular beam. For example, for a given target fluence and a pattern width 313 of 15 or 30 mm, the required power of each optical beam is 56 kW for a linear beam and 225 kW for a circular beam.

In FIG. 3B, two consecutive laser profiles that pass through a line generator create line beams 315a and 315b. Depending on the speed of the conveyor belt $V_{conveyor}$, the line beams 315a and 315b can just border each other. The laser source and the line generator can determine the width 317 and height 319 of each line beam. For example, for a given target fluence and a pattern width 313 of 15 or 30 mm, the required power of each line beam is 50 W and 100 W. Consequently, the required laser power can be reduced by using line beams instead of circular beams.

In some implementations, the energy profile of the line beams 315a and 315b include highest energy density at the center and lowest energy density at the top and bottom in the vertical direction. Accordingly, the height 319 can be selected to allow for sufficiently high fluence to bleach a region where the barcode will likely be printed, e.g., the size of the barcode plus or minus a tolerance distance, and allow for a lower fluence in a region outside of the region where the barcode will likely be printed.

Figure 3C:
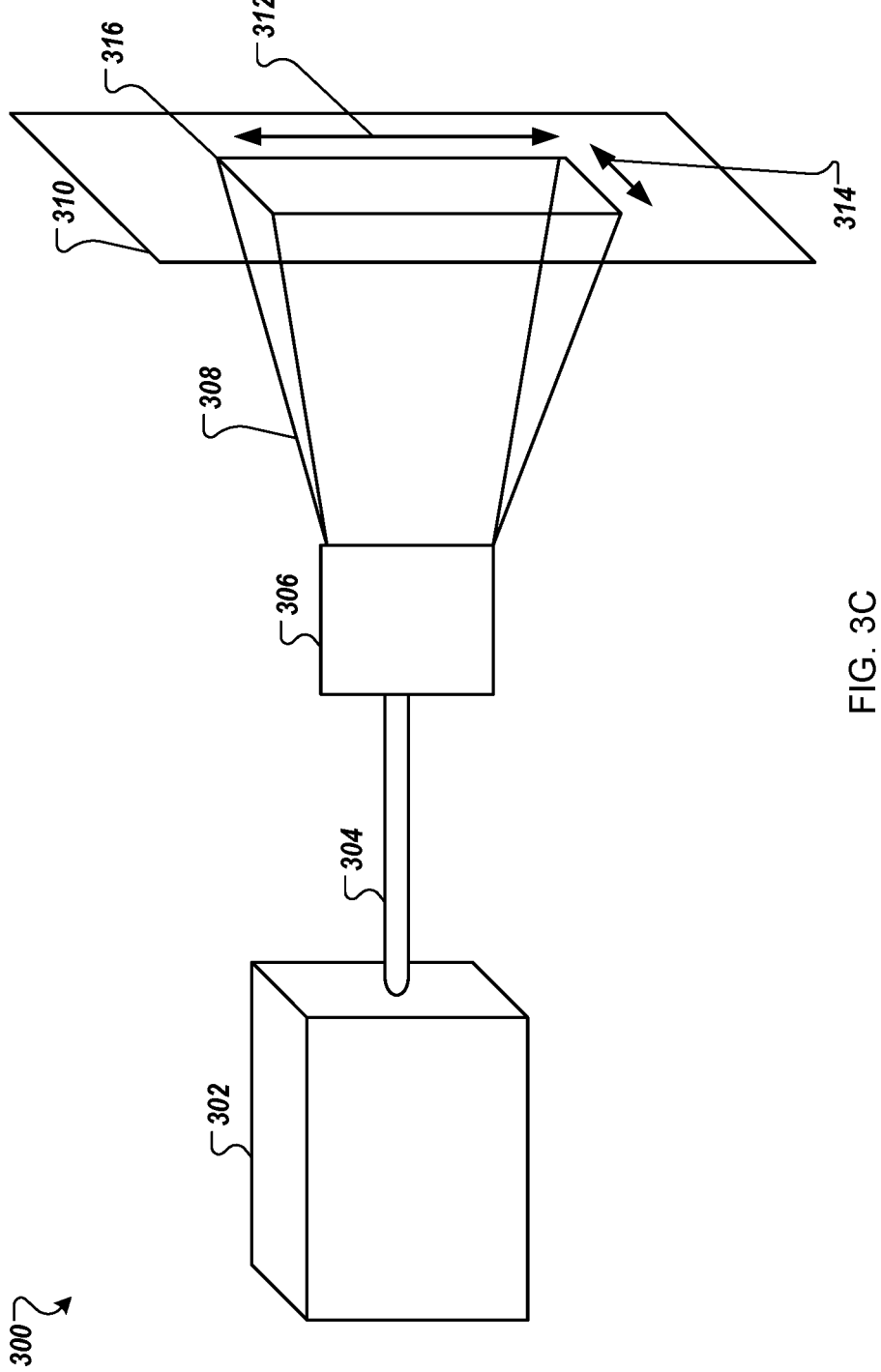
FIG. 3C depicts an example of a laser bleaching subsystem with a line generator.

FIG. 3C depicts an example of a laser bleaching subsystem 300 with a line generator 306. The laser bleaching subsystem 300 can include a laser 302, which generates a circular, collimated laser beam 304. After passing through a line generator 306, the circular, collimated laser beam 304 becomes a line beam 308. The line beam 308 encounters a surface 310, and the projected spot 316 appears on the surface 310. The size of the beam's area on the surface, e.g., height 312 and width 314, depend on the distance between the line generator 306 and the surface 310, which can be selected to provide a predetermined height and width of line beam 308 at the surface 310. In some implementations, the line generator 306 is a Powel lens, a diffractive optical element, an asphere, or another optical element. The height 312 of the projected spot 316 can be designed as needed, and the width 314 of the linear spot 316 can depend on the diffraction limit of the laser beam 304.

Figure 4:
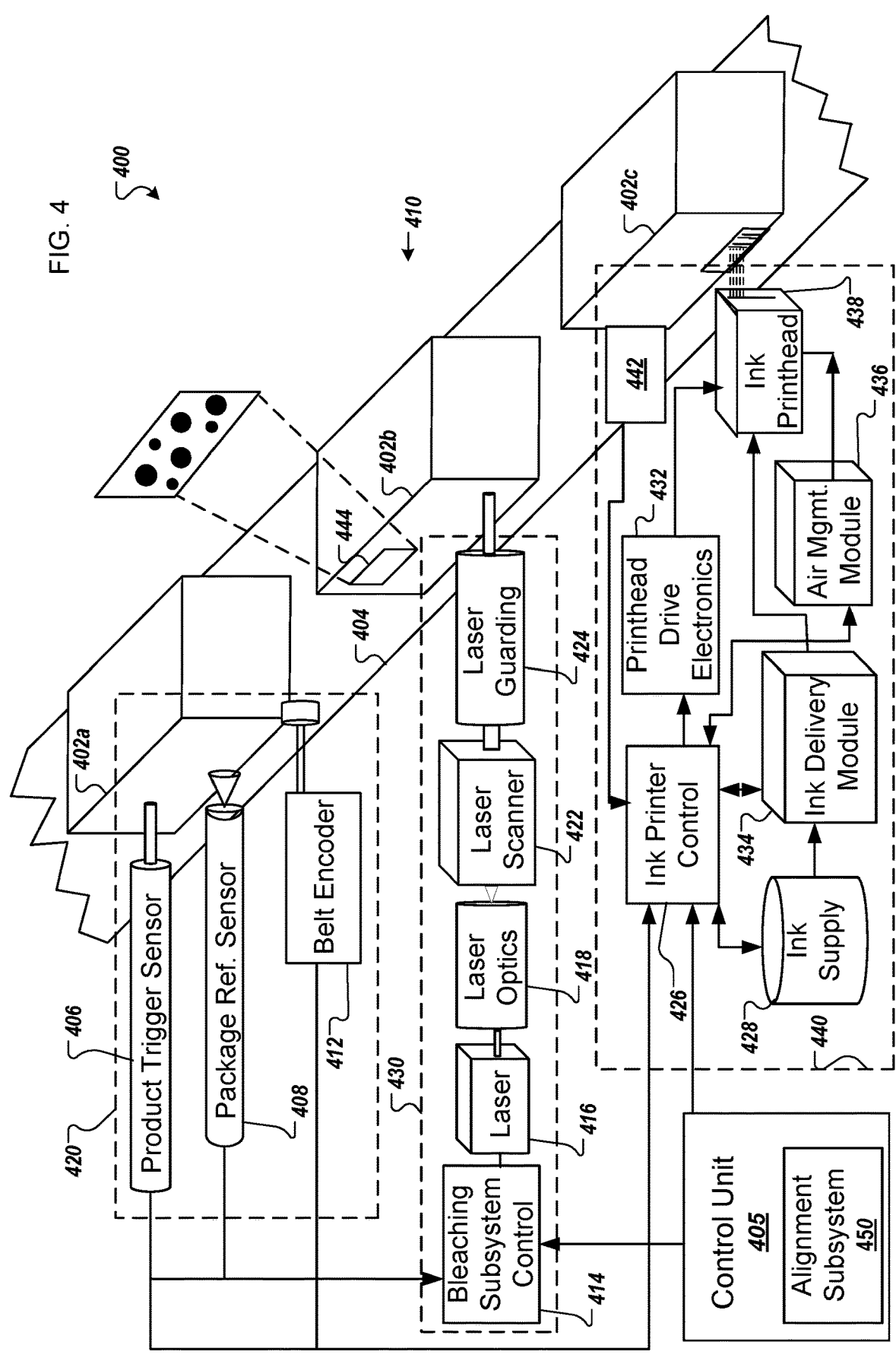
FIG. 4 depicts an example of a system when printing follows lasing.

FIG. 4 depicts an example of a system 400 when printing follows lasing. The system 400 includes a package conveying subsystem 410, a characterization subsystem 420, a laser bleaching subsystem 430, an ink printer subsystem 440, an alignment subsystem 450, and a control unit 405. The control unit 405 can send instructions determined by the barcode standards for laser bleaching and printing to the laser bleaching subsystem 430 and the ink printer subsystem 440.

The package conveying subsystem 410 can convey packages, e.g., packages 402a-c, along a conveyor belt 404 or other support structure. The conveyer belt 404 has a speed, which the alignment subsystem 450, control unit 405, or both can control.

The characterization subsystem 420 includes a product trigger sensor 406, a package reflectance sensor 408, and a belt encoder 412. The product trigger sensor 406 can detect the presence of a package. The package reflectance sensor 408 can determine a nature of the package, e.g., the reflectivity of the surface of a package 402a. In some implementations, the package reflectance sensor 408 is configured like the package reflectance sensor 106. In some implementations, the package reflectance sensor 408 can measure speckle of the package. In such implementations, the package reflectance sensor 408 can include a linear or two-dimensional imaging array, such as a complementary metal-oxide semiconductor (CMOS) or charge-coupled device (CCD) imaging sensor, to characterize the material properties of the package that can impact the grading of barcodes directly on the package with ink.

For example, the package reflectance sensor 408 can measure the flute profile of a corrugated material. With reference to FIG. 2, the thickness of a flute 134 between outer and inner surfaces 118a and 118b of a corrugate material is the width from the outer surface 118a to the inner surface 118b. The flutes per linear foot are the number of flutes along a "linear foot" as measured along either the outer and inner surfaces 118a or 118b. The package reflectance sensor 408 can determine these properties by measuring the reflection of one or more focused, visible or infrared beams, as a function of position along the surface. If the reflectivity varies sinusoidally, the variation of the sinusoid with focus depth can determine the thickness variation of the corrugate, and the period of the sinusoid can determine the number of flutes per linear foot.

The package reflectance sensor 408 can also detect crinkles, flecks of uneven color, speckle, surface roughness, e.g., see zone 444 on package 402a, which includes speckle, e.g., patches of small dots. These measurements can determine parameters like the maximum and minimum reflectivities and edge and symbol contrast. Additionally, the speckle measurement can be used to select a location of printing the symbol to avoid printing in a zone 444 with speckle that can cause the symbol to have too low symbol contrast.

The belt encoder 412 can measure the speed of the conveyor belt 404. Each of the product trigger sensor 406, package reflectance sensor 408, and belt encoder 412, can communicate data to the bleaching subsystem control 414.

The laser bleaching subsystem 430 can bleach a first portion of the surface of a package. The laser bleaching subsystem 430 includes a laser 416. In some implementations, the laser is a $CO_2$ laser that generates a laser with a wavelength of about 9.3 microns. In this specification, about means ±1%, ±0.5%, or ±0.1% of the specified value, depending on the implementation. For example, the wavelength of the laser can be about 9.3, e.g., 9.3±0.01 micron.

The bleaching subsystem control 414 can include software and a computer, which can control parameters of the laser 416. The one or more parameters can include a spot dwell time, a distance between spot dwells, laser power, laser wavelength, or a combination thereof. The combination of parameters can determine a projected spot of the laser beam, which affects an optical fluence of the laser beam. The chosen parameters can be based on the average reflectivity measurement from the package reflectance sensor 408. In some implementations, the target optical fluence is between 0.5 and 1.1 J/cm$^2$.

The laser bleaching subsystem 430 includes an optical assembly, e.g., laser 416, laser optics 418 and laser scanner 422. A laser beam generated by the laser 416 can pass through laser optics 418 to produce a beam with a target profile. Then the laser beam can pass through the laser scanner 422, which directs the beam toward a package. In some implementations, laser scanner 422 includes a beam director, e.g., a galvometer, a micro-electro-mechanical system (MEMs), a rotating polygonal mirror, etc., arranged to scan the laser beam onto a package along a controlled path. In some implementations, laser guarding 424 is shaped to prevent laser light from exiting the laser bleaching subsystem 430 at an angle that would allow the laser light to hit a person's eye, to not allow a person to put a hand in the trajectory of the laser, or both. In some implementations, there is at least a 30% overlap of the projected spot of the laser beam on the surface of the package as the laser bleaching subsystem 430 scans the projected spot of the laser beam on the surface of the package. In some implementations, the laser beam has an infrared wavelength, and the controlled path includes between 30% and 56% overlap of the projected spot of the infrared laser beam as the laser scanner 422 scans the projected spot of the infrared laser beam on the surface of the package.

The ink printer subsystem 440 can print a symbol on a second portion of the surface of a package. In some implementations, the first and second portions overlap. In other implementations, the first and second portions do not overlap. Ink printer control 426 can communicate with ink supply 428, printhead drive electronics 432, ink delivery module 434, and air management module 436. The ink supply 428 can send information about ink supply to the ink delivery module 434. The printhead drive electronics 432, ink delivery module 434, and air management module 436 can send instructions to an ink printhead 438, which can print a symbol on the surface of a package using ink. In some implementations, the ink printer subsystem 440 is an ink-based printer, such as a continuous inkjet printer, liquid piezoelectric printer, hot melt piezoelectric printer, or a flexographic printer.

In some implementations, the control unit 405 includes an alignment subsystem 450 that uses information about the system 400 to determine instructions for the laser bleaching subsystem 430 and ink printer subsystem 440 that lead to proper alignment. For example, the alignment subsystem 450 can use a "dead reckoning" technique to ensure proper alignment, e.g., interweaving of the ink symbol and oxidized regions. In the example of a barcode, which is composed of a series of rectangular ink marks, dead reckoning includes measuring a separation between the point where the laser beam encounters a package and the point where ink from the ink printhead 438 reaches the package. That separation can be used to determine the offset of the oxidized region and symbol in terms of pixels or a physical width, such as in mm. Dead reckoning tends to produce accurate results when the separation remains a predetermined fixed value, the separation can be measured to the accuracy of a pixel or less, and when the packages do not jostle much from the laser bleaching subsystem 430 and ink printer subsystem 440.

A second method of alignment includes using a registration mark, e.g., a crosshairs or bullseye that has been preprinted on a predetermined location of each package.

When printing follows lasing, the laser bleaching subsystem 430 can mark the package with the registration mark. An imaging camera 442 on whichever of the laser bleaching subsystem 430 and ink printer subsystem 440 is second can detect the registration mark with accuracy of less than a pixel. The laser bleaching subsystem 430 or the ink printer subsystem 440 can be calibrated to begin printing a predetermined number of pixels from the registration mark. This method of alignment does not depend on the distance between the laser bleaching subsystem 430 and ink printer subsystem 440.

A third method of alignment is for whichever of the laser bleaching subsystem 430 and ink printer subsystem 440 is second to track the pattern produced by the first of the two subsystems. For example, the laser bleaching subsystem 430 can include an imaging camera 442 that can detect the ink pattern created by the ink printer subsystem 440, or the ink printer subsystem 440 can include an imager that can detect the oxidized region created by the laser bleaching subsystem 430. The third method of alignment does not depend on the distance between the laser bleaching subsystem 430 and ink printer subsystem 440. Additionally, the third method allows for the laser bleaching subsystem 430 to bleach any ink satellites, e.g., spurious micro-droplets created while ink printing. The third method also can prevent unintentional bleaching of the ink pattern, which can reduce the symbol contrast.

Figure 5:
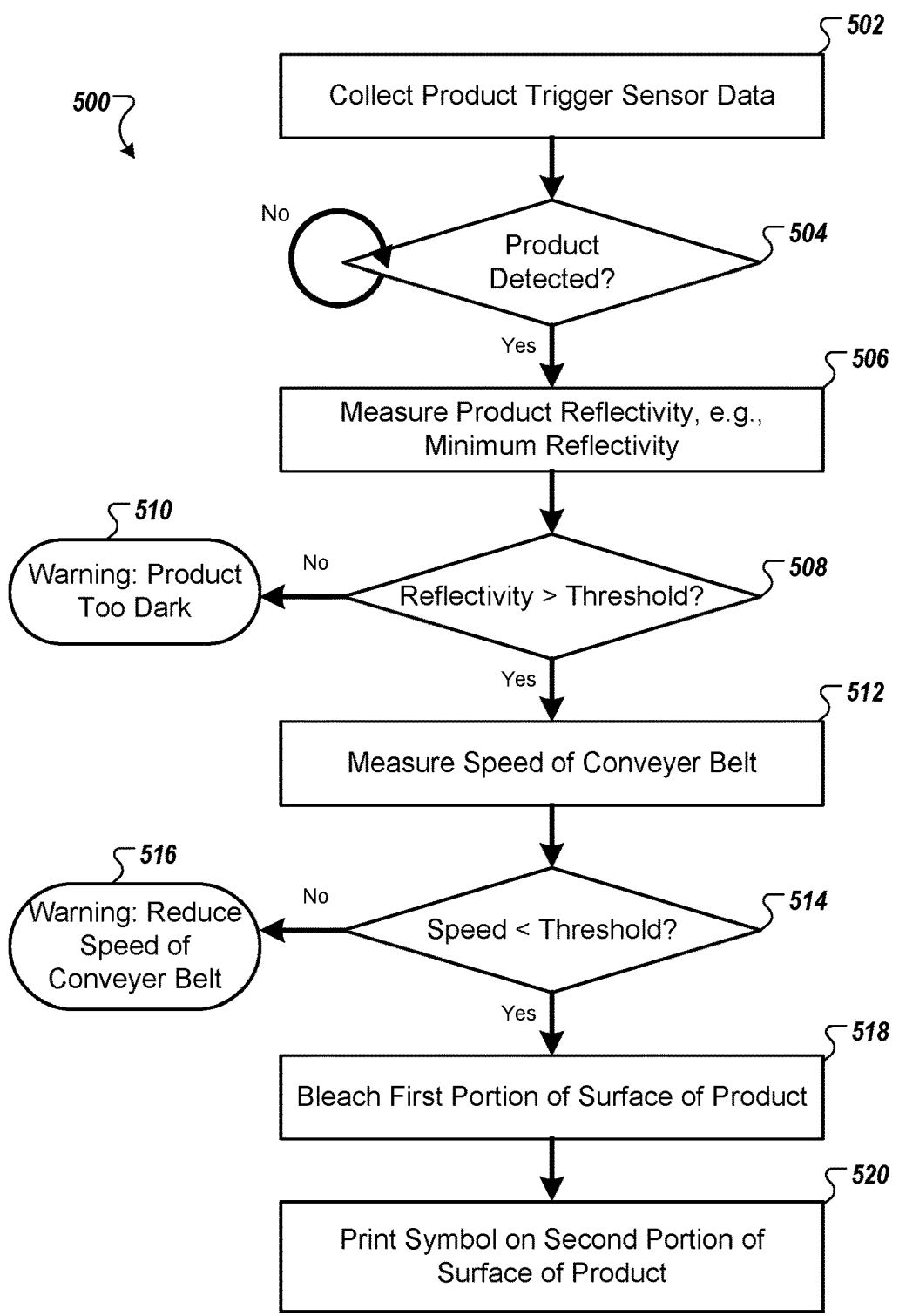
FIG. 5 depicts an example of the method of high contrast printing.

FIG. 5 depicts an example of the process 500 of high contrast printing. For example, the process 500 can be used by the systems 100, 400, 600, and 700. The product trigger sensor 406 can collect data (502). If the product trigger sensor 406 detects a product (504), e.g., a package, process 500 can continue to the next operation. Optionally, the product trigger sensor 406 can send the time of detection to the bleaching subsystem control 414, the ink printer control 426, and/or alignment subsystem 450. If the product trigger sensor 406 does not detect a product (504), it can continue to collect data until a product is detected.

The package reflectance sensor 408 can measure the product reflectivity (506). The bleaching subsystem control 414 can determine if the reflectivity is greater than a threshold reflectivity (508). If the reflectivity is greater than the threshold reflectivity, e.g., the material at the product is bright enough, process 500 can continue. If the reflectivity is less than the threshold reflectivity, then the system 400 can issue a warning that the material of the product is to dark (510).

The belt encoder 412 can measure the speed of the conveyor belt 404 (512). The speed of the conveyor belt 404 can affect the laser bleaching process, the printing process, or both. The bleaching subsystem control can determine if the speed of the conveyor belt is less than a threshold speed, which is the maximum allowed speed of the conveyer belt (514). If the speed of the conveyor belt is less than a threshold speed, the process 500 can continue. If the speed of the conveyor belt is greater than the threshold speed, the system 400 can issue a warning to reduce the speed of the conveyor belt (516).

The laser bleaching subsystem 430 can bleach a first portion of the surface of the product (518). In some implementations, the laser bleaching subsystem 430 can use the time of detection and speed of the conveyor belt to determine when to begin bleaching the portion of the surface of the product. The bleached portion has a lighter color, e.g., white, than the portion prior to bleaching.

The ink printer subsystem 440 can print a symbol on a second portion of the surface of the product (520). In some implementations, the ink is black ink. In some implementations, the first and second portions overlap. In other implementations, the first and second portions do not overlap. In this specification, portions, profiles, or both "overlapping" means that the areas of two portions of a surface of a product or two beam profiles have a region of common area, e.g., the region with height 305 and width 307 of overlapping laser beams 301a and 301b in FIG. 3A.

The order of operations in the process 500 described above is illustrative only, and high contrast printing can be performed in different orders. For example, and as will be discussed with reference to FIG. 6, bleaching (518) and printing (520) can occur in reverse order.

In some implementations, the process 500 can include additional operations, fewer operations, or some of the operations can be divided into multiple operations. For example, anyone of operations 502, 504, 506, 508, 510, 512, 514, and 516, may be omitted.

Figure 6:
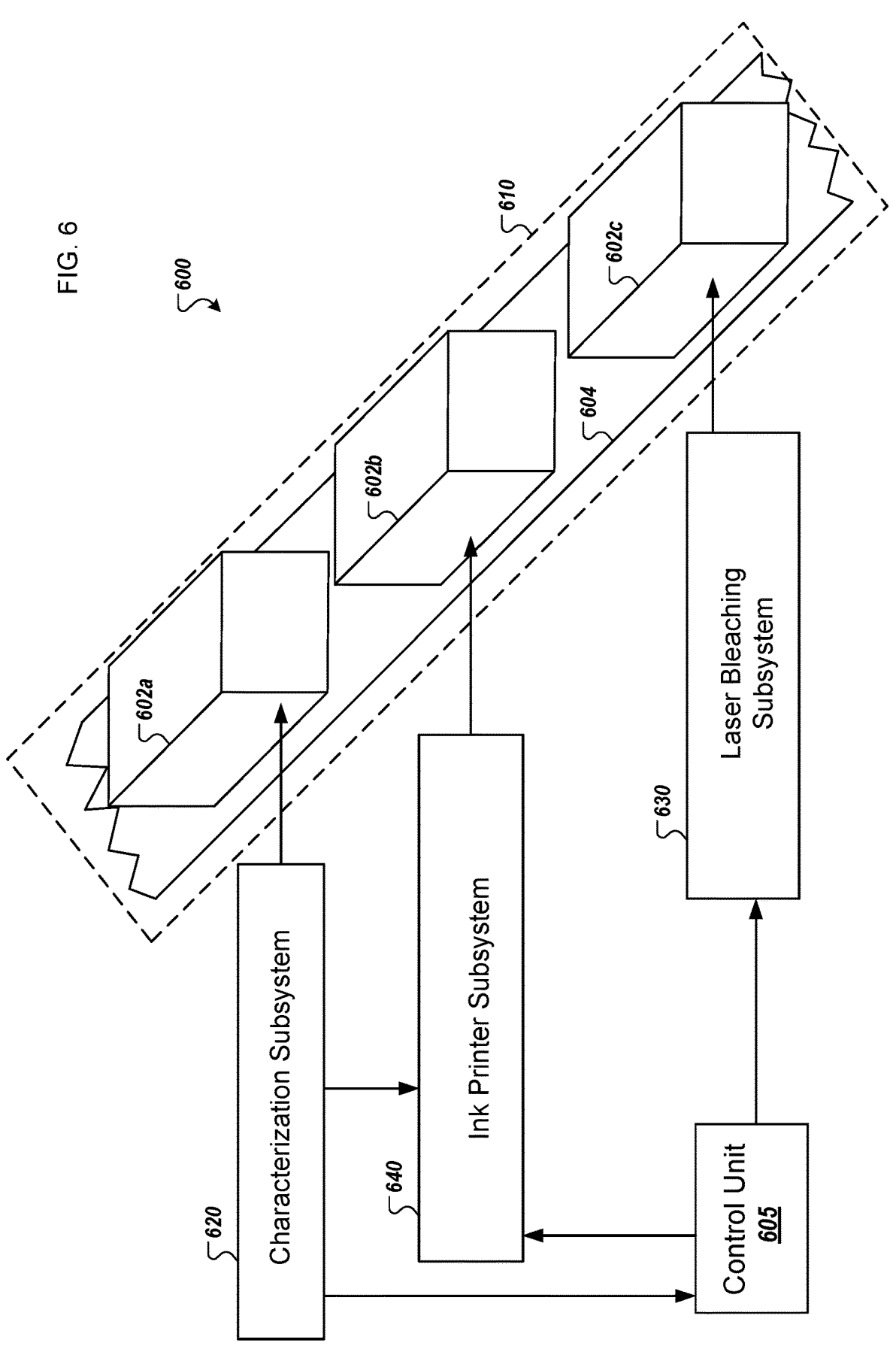
FIG. 6 depicts an example of a system when lasing follows printing.

FIG. 6 depicts an example of a system 600 when lasing follows printing. The system 600 includes a package conveying system 610, an optional characterization subsystem 620, a laser bleaching subsystem 630, and ink printer subsystem 640, and a control unit 605. A package conveying system 610 conveys packages, e.g., packages 602a, 602b, and 602c, on a conveyor belt 604 or another support structure.

The description for the characterization subsystem 420, a laser bleaching subsystem 430, and ink printer subsystem 440, and a control unit 405 applies to the characterization subsystem 620, the laser bleaching subsystem 630, the ink printer subsystem 640, and the control unit 605, respectively.

In some implementations, the laser bleaching subsystem 630 can lase the printed symbol to darken the symbol. Darkening the symbol can reduce the minimum reflectance of the material of the package, which can increase the symbol contrast. In some implementations, the laser bleaching subsystem 630 can lase satellites, e.g., accidental ink marks in the bleached background, which can increase maximum reflectance and thus the symbol contrast. The laser parameters used by the laser bleaching subsystem 630 can be different for lasing the printed symbol to darken the symbol and bleaching satellites.

Figure 7:
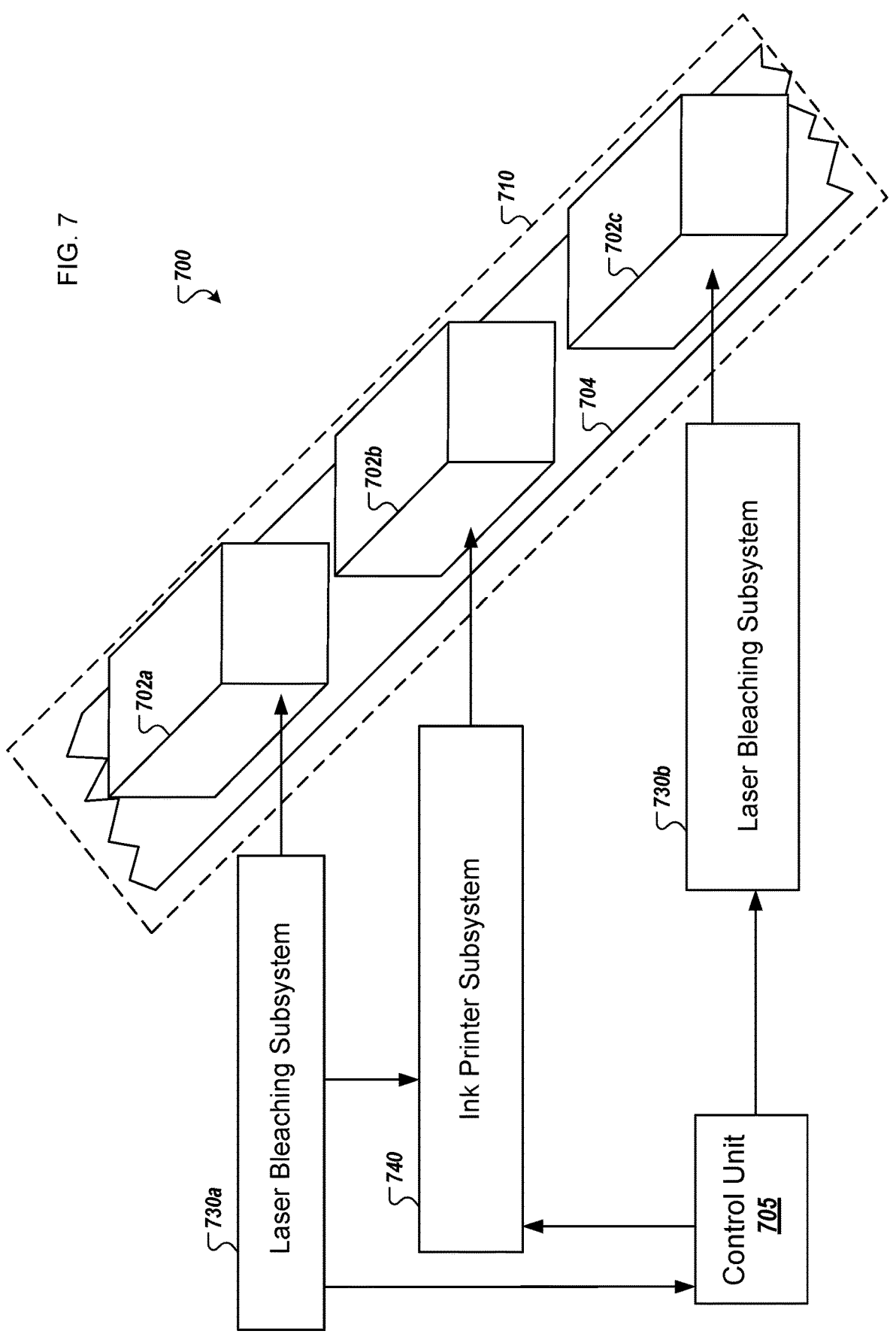
FIG. 7 depicts an example of a system with two laser bleaching subsystems.

FIG. 7 depicts an example of a system 700 with two laser bleaching subsystems 730a and 730b. A package conveying system 710 conveys packages, e.g., packages 702a, 702b, and 702c, on a conveyor belt 704 or another support structure. Optionally, system 700 includes a characterization subsystem, e.g., characterization subsystem 420.

The description for the characterization subsystem 420, a laser bleaching subsystem 430, and ink printer subsystem 440, and a control unit 405 applies to the laser bleaching subsystems 730a and 730b, the ink printer subsystem 740, and the control unit 705, respectively.

In some implementations, the first laser bleaching subsystem 730a pre-lases a portion of a surface of a package to create a bleached background. Then, the ink printer subsystem 740 can print a symbol on top of the bleached background. Then the second laser bleaching subsystem 730b can lase the printed symbol to darken the symbol. Darkening the symbol can reduce the minimum reflectance of the material of the package, which can increase the symbol contrast. In some implementations, the second laser bleaching subsystem 730b can lase satellites, e.g., accidental ink marks in the bleached background, which can increase maximum reflectance and thus the symbol contrast. The laser parameters used by the second laser bleaching subsystem 730b can be different for lasing the printed symbol to darken the symbol and bleaching satellites.

In some implementations, the first laser bleaching subsystem 730a characterizes a package using a laser and sends information regarding the package to the control unit 705.

Figures 8A, 8B, 8C:
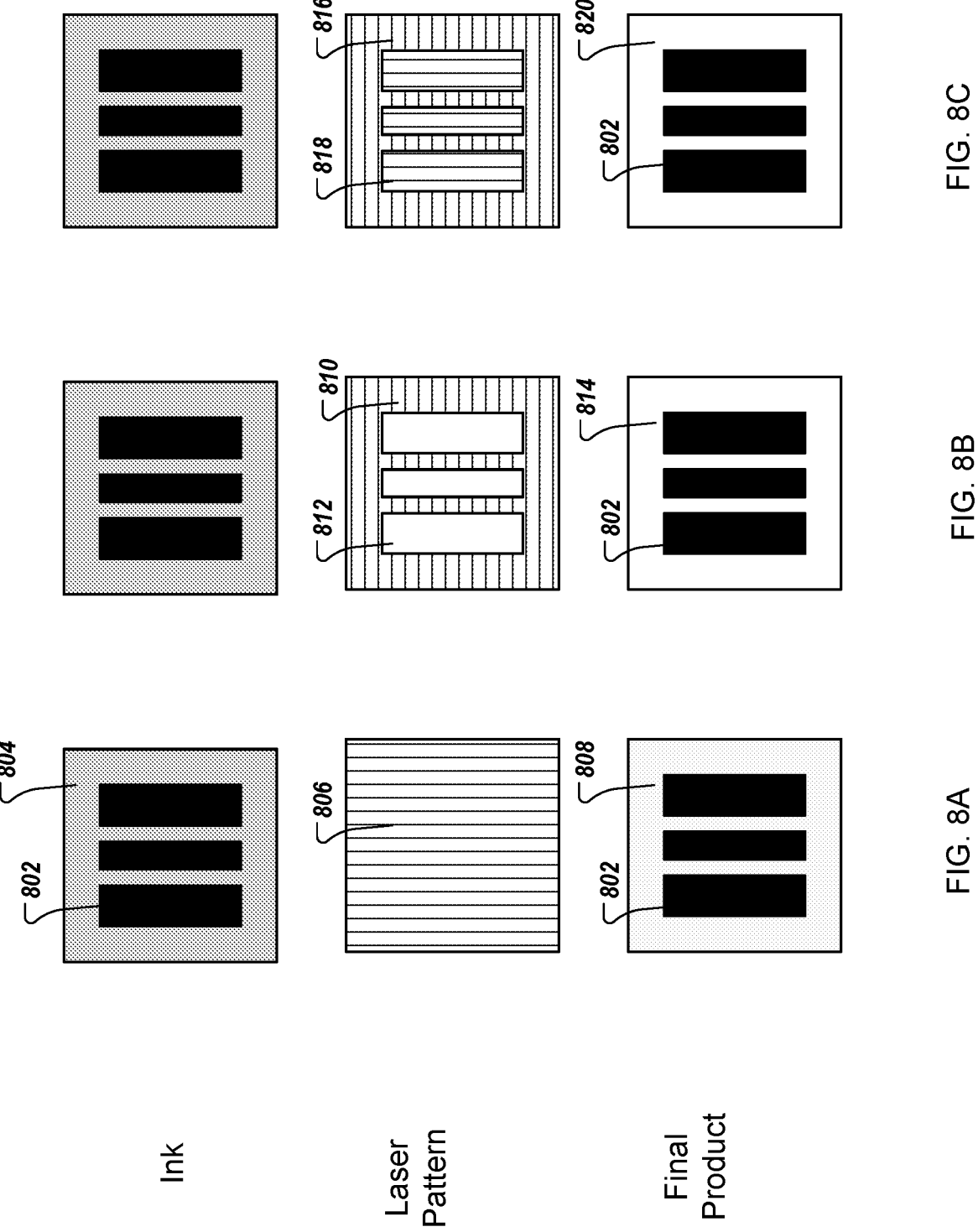
FIGS. 8A-8C depict schematics of examples of ink and laser patterns.

FIGS. 8A-8C depict schematics of examples of ink and laser patterns. In some implementations, lasing follows printing. In other implementations, printing follows lasing. In some implementations, a first laser bleaching subsystem 730a can lase a first region, then the ink printer subsystem 740a can print a symbol in a second region and a second laser bleaching subsystem 730b can lase a third region. In some implementations, any two of the first, second, and third regions overlap. In the examples of 8A-8C, the material being bleached and printed upon can be brown corrugate. The symbol of printing, e.g., the ink pattern, can be a data-encoding symbol (e.g., a barcode) that achieves a B-grade as a result of the systems and techniques described in this application.

The top row of FIGS. 8A-8C depict an ink pattern 802, e.g., a barcode or other symbol, on the material 804, which is gray to indicate it has a darker color than white. The second row of FIGS. 8A-8C depict a laser pattern 806, which is different for each of FIGS. 8A-8C.

In FIG. 8A, the entire laser pattern 806 is a uniform, low fluence, e.g., 0.4-0.5 J/cm$^2$, (indicated by vertical lines) field. The final product in the third row of FIG. 8A includes the ink pattern 802 and a bleached background 808, where the ink pattern 802 is printed within the bleached background 808.

Either order of printing the ink pattern 802 and lasing laser pattern 806 is possible. For example, the laser bleaching subsystem 430 from system 400 can first lase a region corresponding to the bleached background 808. Then the ink printer subsystem of system 400 can print the ink pattern 802 on top of the bleached background. Alternatively, the ink printer subsystem 640 from the system 600 can first print ink pattern 802 on a first region. Then, the laser bleaching subsystem 630 from system 600 can lase a second region, which includes the first region. In some implementations, depending on the fluence of the lasing, lasing the ink pattern 802 can darken the ink pattern 802.

In some implementations, the control unit 405 does not necessarily use the alignment subsystem 450, to achieve printing ink pattern 802 within the bleached background 808. For example, when printing follows lasing, the laser bleaching subsystem 430 can bleach a region much wider than the ink pattern 802 so that there is a tolerance for where the ink pattern 802 starts to still be within the bleached background 808. As another example, when lasing follows printing, the laser bleaching subsystem 630 can lase the entire symbol and an area around it to darken the symbol, provide a bleached background, or both.

In FIG. 8B, the laser pattern has a first region 810 of uniform, high fluence, e.g., 0.5-1.0 J/cm$^2$, (indicated by horizontal lines) and a second region 812 of no fluence (indicated by uniform, white fill). The final product in the third row of FIG. 8B includes the ink pattern 802 and a bleached background 814. In FIG. 8B, the ink and laser bleaching are interlaced, as the ink pattern 802 and laser pattern with nonzero optical fluence, e.g., first region 810, do not overlap. Rather, the ink pattern 802 borders the bleached background 814. In some implementations, the bleached background 814 is a lighter color than the bleached background 808, since a laser pattern with a higher fluence was used to create the bleached background 814.

Either order of printing the ink pattern 802 and lasing the laser pattern of the first region 810 is possible. For example, the laser bleaching subsystem 430 from system 400 can first lase region first 810. Then the ink printer subsystem of system 400 can print the ink pattern 802 in the second region 812. Alternatively, the ink printer subsystem 640 from the system 600 can first print ink pattern 802 on the second region 812. Then, the laser bleaching subsystem 630 from system 600 can lase the first region 812.

In FIG. 8C, the laser pattern has a first region 816 of uniform, high fluence (indicated by horizontal lines) and a second region 818 of uniform, low fluence (indicated by vertical lines). The final product in the third row of FIG. 8C includes the ink pattern 802 and a bleached background 820. In some implementations, the bleached background 820 is a lighter color than bleached background 808, since a laser pattern with a higher fluence was used to create the bleached background 814. In some implementations, the bleached background 820 has a similar color to bleached background 814, since a high fluence field was used to create both backgrounds.

In some implementations, the order of lasing and printing in FIG. 8C is as follows. A first laser bleaching subsystem 730a from system 700 can lase the first region 816. In some implementations, first laser bleaching subsystem 730a lases the first region 816 and the second region 818 before any printing. Second, the ink printer subsystem 740 from system 700 can print ink pattern 802. Third, the second laser bleaching subsystem 730b from system 700 can lase the second region 818, which can darken the ink pattern 802.

The bleached backgrounds 808, 814, and 820 are brighter that those regions prior to bleaching. For example, the bleached backgrounds 808, 814, and 820, e.g., the oxidized regions, can each have a 55% maximum reflectance when measured by a barcode reader. The contrast between the dark ink pattern of the data-encoding symbol and the bleached backgrounds, e.g., oxidized regions, can be at least 50%.

Figure 9:
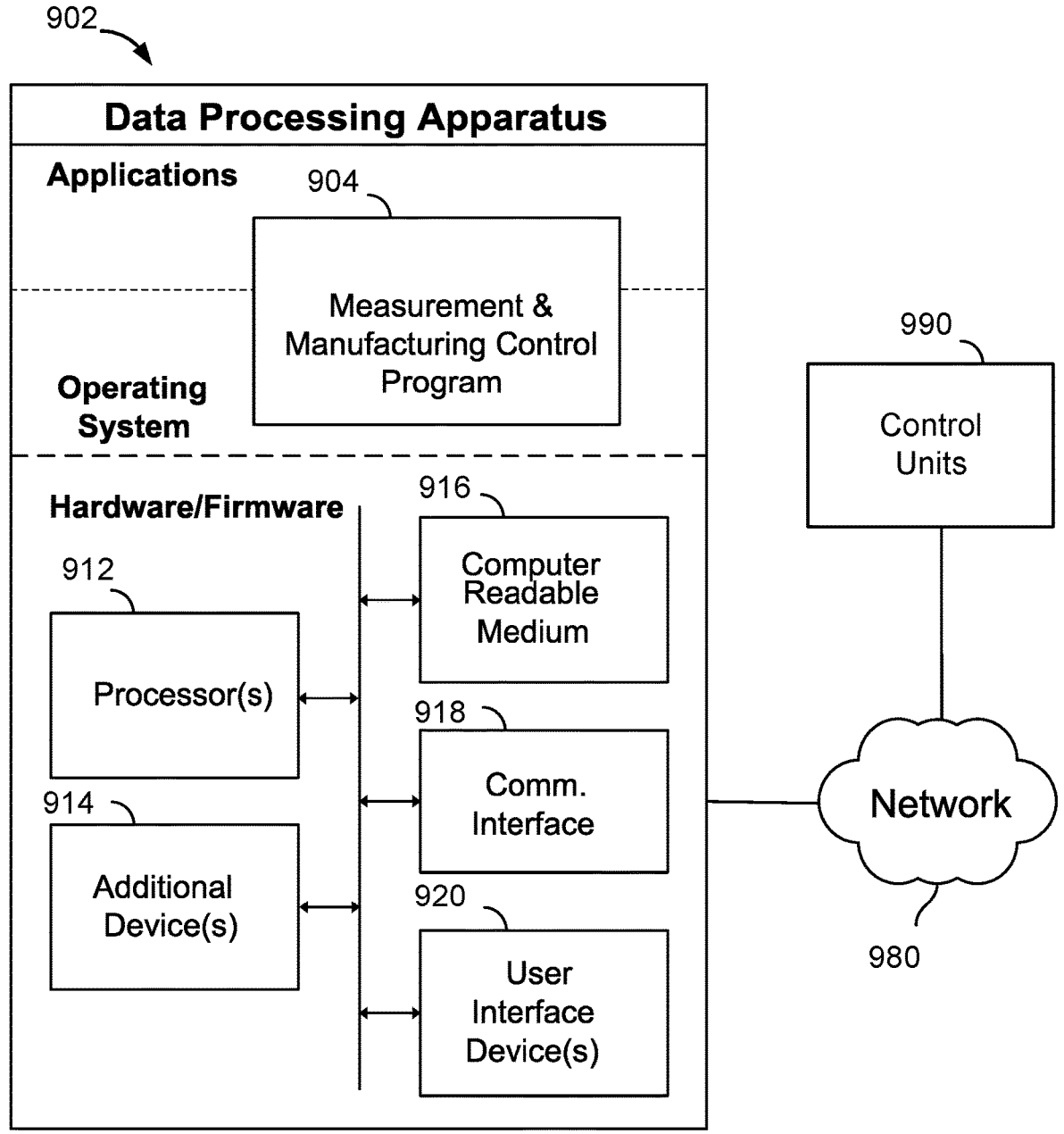
FIG. 9 is a schematic diagram of a data processing system usable to implement the described systems and techniques.

FIG. 9 is a schematic diagram of a data processing system including a data processing apparatus 902 which can be programmed as a client or as a server. The data processing apparatus 902 is connected with one or more controller units 990 through a network 980. The data processing apparatus 902 is a computing system that interfaces with and manages the operation of one or more control units 990, e.g., control units 105, 405, 605, and 705. The one or more control units interfacing with the data processing apparatus 902 can control laser bleaching subsystems 430, 630, 730a, and 730b, ink printer subsystems 440, 640, and 740 in a production, packaging, and/or distribution facility/site.

While only one computer is shown in FIG. 9 as the data processing apparatus 902, multiple computers can be used. The data processing apparatus 902 includes various software, firmware and/or hardware modules, which can be distributed between an applications layer and an operating system. These can include executable and/or interpretable software programs or libraries, firmware and/or hardware components, including tools and services of a measurement and manufacturing control program 904 that implement the systems and techniques described above. The number of modules used can vary from one implementation to another. Moreover, the modules can be distributed on one or more data processing apparatus connected by one or more computer networks or other suitable communication networks.

The data processing apparatus 902 also includes hardware or firmware devices including one or more processors 912, one or more additional devices 914, a computer readable medium 916, a communication interface 918, and one or more user interface devices 920. Each processor 912 is capable of processing instructions for execution within the data processing apparatus 902. In some implementations, the processor 912 is a single or multi-threaded processor. Each processor 912 is capable of processing instructions stored on the computer readable medium 916 or on a storage device such as one of the additional devices 914. The data processing apparatus 902 uses the communication interface 918 to communicate with one or more computers 990, for example, over the network 980. Examples of user interface devices 920 include a display; camera; speaker; microphone; tactile feedback device; keyboard; mouse; and VR and/or AR equipment. The data processing apparatus 902 can store instructions that implement operations associated with the program(s) described above, for example, on the computer readable medium 916 or one or more additional devices 914, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions, and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including: semiconductor memory devices (e.g., Erasable Programmable Read-Only Memory (EPROM) and Electrically Erasable Programmable Read-Only Memory (EEPROM); flash memory devices; magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD), an organic light emitting diode (OLED), or another monitor for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A system comprising:
   at least one ink-based printer configured and arranged to provide ink to form a symbol on a surface of a material;
   at least one laser bleaching subsystem comprising
      a laser operable to produce a laser beam, and
      an optical assembly operable to convey the laser beam onto the surface of the material to generate a bleached region on the surface of the material; and
   electronics communicatively coupled with the at least one ink-based printer and the at least one laser bleaching subsystem, the electronics being configured to coordinate control operations of the at least one ink-based printer and the at least one laser bleaching subsystem using control parameters based on an absorption profile of the surface of the material, thereby generating the bleached region.

2. The system of claim 1, wherein the optical assembly comprises a line generator configured and arranged to receive the laser beam and shape the laser beam into a line of a predetermined length across the surface of the material to generate the bleached region on the surface of the material.

3. The system of claim 1, wherein the electronics are configured to determine the absorption profile of the surface of the material from data generated by a reflectance sensor, the absorption profile including average reflectivity and speckle.

4. The system of claim 1, wherein the electronics are configured to control a placement of the symbol on the surface of the material based on speckle of the surface of the material.

5. The system of claim 1, wherein the at least one laser bleaching subsystem comprises a first laser bleaching subsystem located before the at least one ink-based printer on a product line, and a second laser bleaching subsystem located after the at least one ink-based printer on the product line, and the electronics are configured to control an order of ink printing and laser bleaching.

6. The system of claim 1, wherein the optical assembly comprises a beam director arranged to scan a projected spot of the laser beam onto the surface of the material along a controllable path to generate the bleached region on the surface of the material.

7. The system of claim 1, wherein the control parameters include spot dwell time, a distance between spot dwells, laser power, laser wavelength, or a combination thereof.

8. The system of claim 1, wherein the electronics are configured to interlace ink from the at least one ink-based printer and laser bleaching by the at least one laser bleaching subsystem to form the symbol.

9. The system of claim 1, wherein the symbol is a barcode, the system comprising an alignment subsystem configured to interdigitate dark ink segments of the barcode with bleached portions of the surface between the dark ink segments.

10. The system of claim 1, wherein a projected spot of the laser beam on the surface of the material comprises an optical fluence between 0.5 and 1.1 $J/cm^2$, and wherein a controllable path of the laser beam comprises at least a 30% overlap of the projected spot of the laser beam on the surface of the material as the optical assembly scans the projected spot of the laser beam on the surface of the material.

11. The system of claim 1, wherein a wavelength of the laser is infrared, and a controllable path of the laser beam comprises between 30% and 56% overlap of a projected spot of the infrared laser beam as the optical assembly scans the projected spot of the infrared laser beam on the surface of the material.

12. The system of claim 1, wherein a wavelength of the laser is 9.3 microns.

13. The system of claim 1, wherein the bleached region on the surface of the material obtains a 55% maximum reflectance on a barcode reader.

14. The system of claim 1, wherein the material is brown corrugate, the symbol on the surface of the material is a B-grade data-encoding symbol, and a contrast between dark ink of the data-encoding symbol and the bleached region is at least 50%.

15. The system of claim 1, wherein the at least one ink-based printer is selected from a group consisting of a continuous inkjet printer, liquid piezoelectric printer, hot melt piezoelectric printer, and a flexographic printer.

16. The system of claim 1, wherein controlling operations of the at least one laser bleaching subsystem using the control parameters based on the absorption profile of the surface of the material comprises modifying an optical fluence of the laser beam with the optical assembly.

17. The system of claim 1, wherein controlling operations of the at least one laser bleaching subsystem using the control parameters based on the absorption profile of the surface of the material comprises producing the laser beam with a wavelength that at least partially overlaps the absorption profile of the surface of the material.

18. A method for controlling a system for high contrast printing, comprising:

collecting reflectivity data about a surface of a package being conveyed in a product line;

determining, using the reflectivity data, control parameters of a laser bleaching subsystem and control parameters of an ink-based printer;

lasing, by the laser bleaching subsystem and using the control parameters of the laser bleaching subsystem, a portion of a surface of the package, thereby generating a bleached region on the surface of the package; and printing, by the ink-based printer and using the control parameters of the ink-based printer, a symbol on the surface of the package, wherein the symbol at least partially borders the bleached region, is at least partially within the bleached region, or both.

19. The method of claim 18, wherein the reflectivity data comprises speckle, and the control parameters of the ink-based printer include a placement of the symbol on the surface of the package.

20. The method of claim 18, wherein the control parameters of the laser bleaching subsystem comprise spot dwell time, a distance between spot dwells, laser power, laser wavelength, or a combination thereof.

* * * * *